United States Patent
Lehinger et al.

(10) Patent No.: US 7,810,145 B2
(45) Date of Patent: Oct. 5, 2010

(54) DISTRIBUTED DATA CONSOLIDATION NETWORK

(75) Inventors: Christian M. Lehinger, Spokane, WA (US); A. Mark Macias, Spokane, WA (US); Scott K. Lehinger, Spokane, WA (US); Jamil H. Adi, Milwaukee, WA (US)

(73) Assignee: DDCNet, LLC, Tullahoma, TN (US)

(*) Notice: Subject to any disclaimer, the term of this patent is extended or adjusted under 35 U.S.C. 154(b) by 1529 days.

(21) Appl. No.: 11/056,464

(22) Filed: Feb. 11, 2005

(65) Prior Publication Data

US 2006/0095958 A1 May 4, 2006

(51) Int. Cl.
- G06F 17/30 (2006.01)
- G06F 15/16 (2006.01)
- G06F 7/10 (2006.01)
- G06F 13/00 (2006.01)
- H04L 29/04 (2006.01)

(52) U.S. Cl. .................... 726/6; 707/711; 707/781; 707/782; 709/201; 711/100; 713/165; 726/27

(58) Field of Classification Search ............... None
See application file for complete search history.

(56) References Cited

U.S. PATENT DOCUMENTS

| | | | |
|---|---|---|---|
| 5,899,998 | A | 5/1999 | McGauley et al. |
| 5,995,965 | A | 11/1999 | Experton |
| 6,289,460 | B1 | 9/2001 | Hajmiragha |
| 6,381,576 | B1 | 4/2002 | Gilbert |
| 6,397,224 | B1 | 5/2002 | Zubeldia et al. |
| 6,463,417 | B1 | 10/2002 | Schoenberg |
| 6,609,202 | B1 | 8/2003 | Chan |
| 6,732,113 | B1 | 5/2004 | Ober et al. |
| 6,734,886 | B1 * | 5/2004 | Hagan et al. ........ 715/853 |
| 6,757,898 | B1 | 6/2004 | Ilsen et al. |
| 6,775,670 | B2 * | 8/2004 | Bessette ............... 707/10 |

(Continued)

FOREIGN PATENT DOCUMENTS

WO 01/50400 A1 7/2001

OTHER PUBLICATIONS

OpenEMed Virtual Patent Record System; openemed.net website; some portions revised Feb. 1999; 9 pages; http://openemed.net/background/TeleMed/Architecture.html.

(Continued)

*Primary Examiner*—Nasser Moazzami
*Assistant Examiner*—Fatoumata Traore
(74) *Attorney, Agent, or Firm*—Michael Best & Friedrich LLP

(57) ABSTRACT

A method and system for storage and retrieval of data, such as personal data. In an embodiment of the invention, a distributed network for storage and retrieval of data comprises a plurality of data origin servers, a plurality of credential servers, and an authentication server. Each data origin server is configured to store items of data and corresponding credentials, each credential at least in part identifying an owner of the corresponding item of data. Each credential server is configured to store associations between credentials and data origin servers on which data corresponding to a respective credential is stored. The authentication server is configured to register and authenticate each user based at least in part on the user's associated credential, and to link each authenticated user to respective credential servers storing associations for the user's credential.

11 Claims, 11 Drawing Sheets

U.S. PATENT DOCUMENTS

| | | |
|---|---|---|
| 6,804,787 B2 | 10/2004 | Dick |
| 7,117,528 B1 * | 10/2006 | Hyman et al. .................. 726/5 |
| 2001/0041991 A1 | 11/2001 | Segal et al. |
| 2001/0053986 A1 | 12/2001 | Dick |
| 2002/0004727 A1 | 1/2002 | Knaus et al. |
| 2002/0016923 A1 | 2/2002 | Knaus et al. |
| 2002/0022975 A1 | 2/2002 | Blasingame et al. |
| 2002/0026328 A1 | 2/2002 | Westerkamp et al. |
| 2002/0029157 A1 | 3/2002 | Marchosky |
| 2002/0032583 A1 | 3/2002 | Joao |
| 2002/0072934 A1 | 6/2002 | Ross et al. |
| 2002/0083192 A1 | 6/2002 | Alisuag |
| 2002/0116227 A1 | 8/2002 | Dick |
| 2002/0165736 A1 | 11/2002 | Tolle et al. |
| 2003/0014654 A1 | 1/2003 | Adler et al. |
| 2003/0046114 A1 | 3/2003 | Davies et al. |
| 2003/0050803 A1 | 3/2003 | Marchosky |
| 2003/0084170 A1 * | 5/2003 | de Jong et al. .............. 709/229 |
| 2004/0030930 A1 * | 2/2004 | Nomura ...................... 713/201 |
| 2004/0088295 A1 | 5/2004 | Glazer et al. |
| 2004/0103000 A1 | 5/2004 | Owurowa et al. |
| 2004/0117215 A1 | 6/2004 | Marchosky |
| 2004/0205055 A1 | 10/2004 | Overton et al. |

OTHER PUBLICATIONS

Farmer, Jon; The Person Identification Service (PIDS); Adaptable Infrastructure Components for the Distributed Enterprise; Mar. 2000; Care Data Systems; Chicago, Illinois.

Los Alamos National Laboratory; CORBA: Healthcare/Insurance; http://www.corba.org/industries/healthins/lanl.html; Jan. 19, 2005; 3 pages.

PCT/US2005/037970 International Search Report.

* cited by examiner

Fig. 1D

| Type Of Server | PIC Authentication Server | | | | | | | | |
|---|---|---|---|---|---|---|---|---|---|
| Databases on Server | PIC Database | | | | PIC Server Integrity Database | | PIC Server Transfer Database | | |
| Basic Fields in Database | PIC | Primary PIC Server ID | Secondary PIC Server ID | Registration Date | PIC Server ID | Status | PIC | Old PIC Server ID | New PIC Server ID | Old Record ID in PIC Database |
| | aa | 3 | 5 | 5/3/2004 | 1 | OK | bb | 4 | 15 | 2 |
| | bb | 2 | 4 | 9/4/2003 | 2 | OK | | | | |
| example | cc | 2 | 1 | 1/23/2004 | 3 | OK | | | | |
| data | dd | 3 | 2 | 12/1/2004 | 4 | OK | | | | |
| | ee | 5 | 2 | 4/19/2004 | 5 | Rebuild | | | | |
| | ff | 5 | 3 | 10/23/2004 | 6 | OK | | | | |
| | gg | 5 | 4 | 7/7/2004 | 7 | Gone | | | | |

Fig. 1C

| Type Of Server | PIC Server | |
|---|---|---|
| Databases on Server | POD Server Database | |
| Basic Fields in Database | PICs | POD Server IDs |
| | aa | 2 |
| | aa | 3 |
| example | aa | 5 |
| data | aa | 6 |
| | bb | 2 |
| | bb | 4 |
| | cc | 2 |

Fig. 1B

| Type Of Server | POD Server | | | |
|---|---|---|---|---|
| Databases on Server | PIC Database | | PIC Server IDs Database | PIC IDs Database |
| Basic Fields in Database | PICs | PODs | PIC Server ID | PICs |
| | aa | asdsad | 1 | aa |
| | aa | sdfg | 2 | bb |
| example | aa | dfghfg | 3 | dd |
| data | aa | fghjjj | 4 | jj |
| | aa | ghjkgh | 5 | rr |
| | aa | wertt | 6 | ss |
| | bb | ertyy | | xx |

DISTRIBUTED DATA CONSOLIDATION NETWORK

FIELD

Embodiments of the invention relate generally to distributed data networks. More specifically, embodiments of the invention relate to methods and systems for distributed storage and/or retrieval of data, such as personal data.

BACKGROUND

In recent years, the importance of ensuring security, confidentiality, and privacy of data has become increasingly clear. In a digital society in which data is electronically stored and disseminated across networks, security and confidentiality can be compromised in even the most elaborate of systems. Personal data, such as medical, financial, or criminal records, are of particular concern because their unauthorized release can have significant financial, legal, professional, personal, or other consequences to the person associated with the released data, as well as to other entities.

Certain kinds of personal data can be useful when not associated with their owner. For instance, research studies often rely on patients' medical records for analysis. However, practical or legal barriers often complicate efforts to gather a large enough body of data for a given study.

SUMMARY

While certain existing systems allow for distributed storage and retrieval of data, they are not completely satisfactory. The following summary sets forth certain example embodiments of the invention described in greater detail below. It does not set forth all such embodiments and should in no way be construed as limiting of embodiments of the invention.

Embodiments of the invention relate to distributed data networks.

One embodiment provides a distributed network for storage and retrieval of data. The network includes a plurality of data origin servers, a plurality of credential servers, and an authentication server. Each data origin server is configured to store items of data and corresponding credentials, wherein each credential identifies, at least in part, an owner of the corresponding item of data. Each credential server is configured to store associations between credentials and data origin servers on which data corresponding to a respective credential is stored. The authentication server is configured to register and authenticate each user based at least in part on the user's associated credential, and to link each authenticated user to respective credential servers storing associations for the user's credential.

In another embodiment, a method of storing and retrieving data is provided. The method may include storing, on a data origin server, items of data and corresponding credentials, each credential at least in part identifying an owner of the corresponding item of data; storing, on a credential server, associations between credentials and data origin servers on which data corresponding to a respective credential is stored; by an authentication server, authenticating a user based at least in part on the user's associated credential; and by the authentication server, linking an authenticated user to a respective credential server storing at least one association for the user's credential.

Other embodiments relate to systems and methods of registering, authenticating, and/or billing entities in a distributed data network. Still other embodiments relate to systems and methods of accessing data that are de-identified. Other embodiments relate to systems and methods of preventing loss of data in a distributed data network.

Still other embodiments will become apparent from the following description and drawings.

BRIEF DESCRIPTION OF THE DRAWINGS

FIG. 1B shows example databases of a POD server according to an embodiment of the invention.

FIG. 1C shows an example database of a PIC server according to an embodiment of the invention.

FIG. 1D shows example databases of a PIC authentication server according to an embodiment of the invention.

DETAILED DESCRIPTION

Figure 1A:
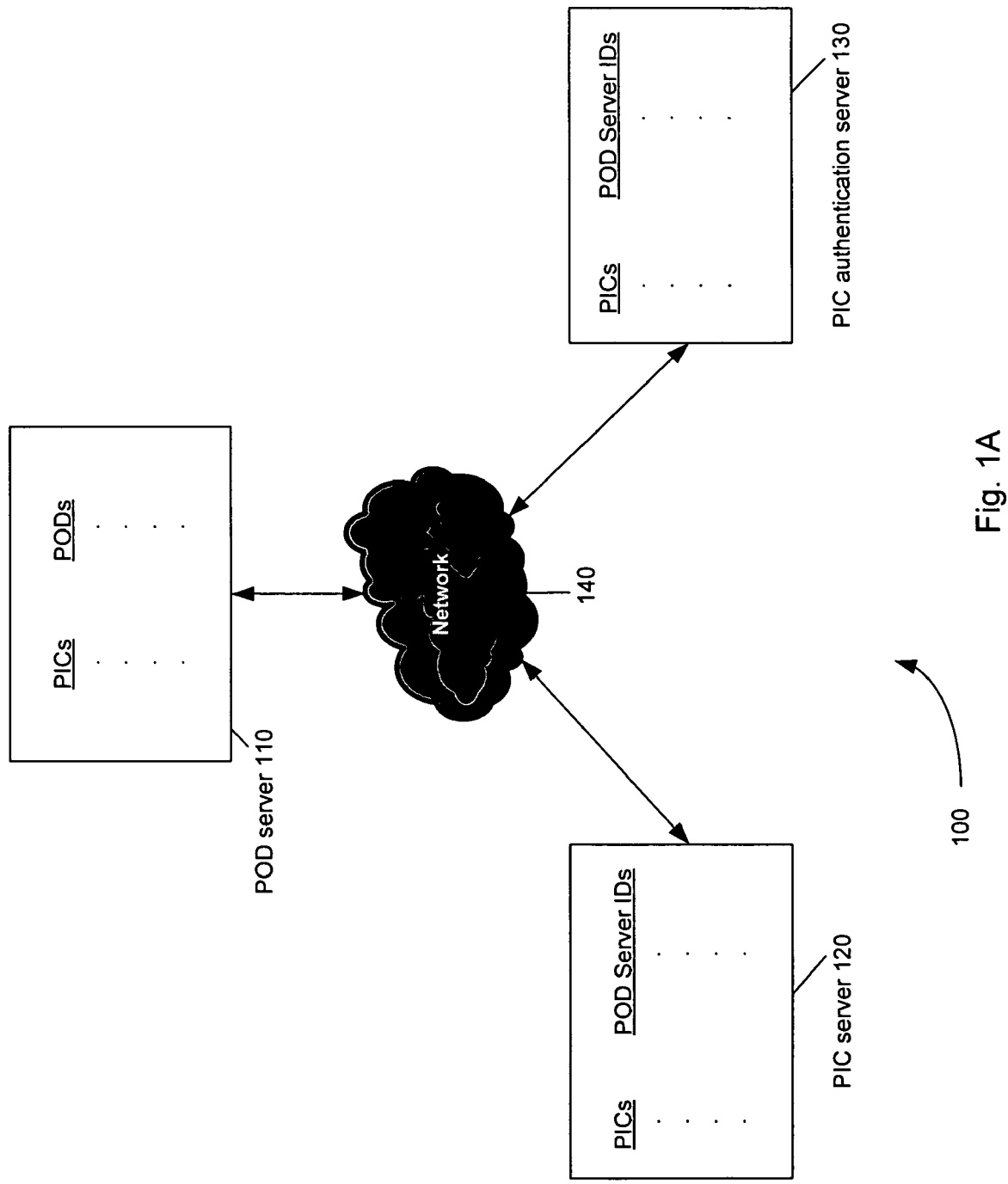
FIG. 1A shows a system according to one possible embodiment of the invention.

Before certain embodiments are described in further detail below, it should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In one embodiment, a distributed data network is implemented as a decentralized, secure network that provides for the retrieval of data from diverse and geographically separated sources operated by hosting organizations. The distributed network can comprise a combination of private sector, institutional, and/or governmental hardware systems communicating through the Internet or other network(s). In an embodiment, various systems run software services in order to function within the distributed network. Other systems run software services and end-user software applications that interface with the software services.

The distributed network can exist across multiple industry sectors, or may be limited in coverage to a particular sector or subset thereof. For instance, a distributed network can be implemented nationally or globally with or without regard to sector, or can be implemented within one company or other organization in a particular sector. The architecture of the distributed network is such that the network can readily expand as additional servers are commissioned for use in the network, the expansion being stimulated by free market forces and unencumbered by proprietary strictures and closed standards. Moreover, the architecture is such that servers can be decommissioned from the network without impacting network operations, and that system recovery can be accomplished expeditiously when components fail.

In an embodiment, the distributed data network processes data that may be highly personal in nature, such as medical, financial, or criminal records. Such data may be subject to limited access and/or strict security standards. In one embodiment, security and confidentiality are maintained in the network by keeping an owner's identity separate from the owner's data, and by allowing the owner's data to be stored in a distributed manner. The data can be located and retrieved by the owner even if the data is stored on a number of servers owned and operated by different and independent hosting organizations.

In some embodiments, researchers and investigators can collect and analyze data associated with multiple individuals and stored within the distributed data network, but without learning the identity of the individuals. In certain sectors, such as law enforcement, researchers and investigators can collect and analyze data belonging to a known individual, or search de-identified data for patterns or trends.

Embodiments herein optionally incorporate commercial aspects. For example, entities can be billed on a flat fee, transactional, and/or other basis for services provided by the distributed network. Recipients of fees can include, for example, entities providing services or related infrastructure in the network, such as server hosting organizations. In some implementations, a user registers with at least one hosting organization for billing purposes. In an exemplary implementation, user registration processes are free of charge, as well as software to be installed on a server to enable functioning within the network. Costs of operating servers in the distributed network can be optionally offset by advertising revenue if advertisement opportunities are created within the network.

Embodiments herein involve credentials, such as personal identification credentials (PICs). A PIC is a secure code that identifies the owner of data, wherein the owner may be a person or thing. The actual identity of the owner cannot be readily derived from the PIC. In an embodiment, a PIC is a globally unique identifier, such as an identifier generated based on biometrics. A PIC is stored along with data to indicate the owner of the data, and is stored and/or generated in other locations to enable the search and retrieval of the stored data. In some embodiments, a PIC is reliably reproducible irrespective of where or when it is generated so long as the requisite hardware and/or software platform is provided, as well as any required inputs, such as biometrics. In an exemplary implementation, a PIC is generated, for example, when a user is first registered in a distributed network, when data for a registered user is to be stored or updated, and when data for a registered user is requested.

A PIC can be generated by a PIC generator implemented with suitable software and/or hardware. The generated PIC may be transmitted to an authentication server. In an implementation, a PIC generator includes a standalone device that can be coupled to a server that receives a registration, storage, or search and retrieval request for a user. In another implementation, the PIC generator is integrated within the server that receives the registration, storage, or search and retrieval request for the user. It is to be appreciated that copy management or digital rights management techniques can be employed to restrict the ability of a party to access a PIC from its point of entry into the distributed network (e.g., at the PIC generator or a POD server) and store such PIC in a memory, such as on a portable memory device. Servers in the distributed network may run software that requires live retrieval of a PIC from a PIC generator, not from a storage location. In an implementation that may be appropriate for selected contexts, a PIC of an individual is stored on a programmable memory device, such as a portable memory card that can be carried by the individual and read by an appropriate reader.

A PIC generator can be, for example, a biometric PIC generator that takes one or more biometric samples from the user (e.g., fingerprint, retina, voice) and generates a PIC for the user based in part on the samples. In an exemplary implementation, a PIC generator uses or modifies the unique fingerprint code generated by a fingerprint reader. It is envisioned that embodiments of the invention can incorporate biometric technologies as they continue to evolve. For instance, one envisioned PIC generator is configured to receive three different biometric samples from an individual, and is configured such that any two of the three samples are used to generate a unique PIC.

In an embodiment, a PIC includes, in addition to a globally unique identifier of the owner, an industry classification code that indicates the type of data being stored or requested for the owner. For instance, respective industry codes can be assigned for medical, financial, or criminal sectors. Accordingly, in such an embodiment, a given individual can have numerous PICs, but only one PIC within a particular industry classification. It is to be appreciated that such a classification code is optional and unnecessary in certain embodiments.

The distributed data network is designed to be redundant and largely self-healing. The network components involved in data retrieval (PIC servers and PIC authentication servers) are capable of restoring or rebuilding their functionality even if the associated hardware is completely replaced. In locations where user data are collected and stored (POD servers), the server operators are expected to adhere to industry standards for data protection and backup. Under the rare catastrophic circumstances where storage media and backup systems both fail, the data loss typically represents only a small fraction of the total data associated with a particular person and stored across the distributed data network.

In the embodiments below, it is to be appreciated that the depicted number, types, identifiers, and configuration of servers are provided for illustrative purposes and are not limiting of embodiments of the invention. Similarly, the depicted database representations and contents are merely illustrative.

FIG. 1A shows a system 100 according to an embodiment of the invention. The system 100 includes a piece of data (POD) server 110, a personal identification credential (PIC) server 120, and a PIC authentication server 130. The various servers communicate over a network 140, such as the Internet, which may include multiple wired and/or wireless communication links. Communication can occur, for example, over a high-speed communication link and can be encrypted. Although only three servers are shown in FIG. 1A, the system 100 can include one or more servers of each type, that is, one or more POD servers 110, PIC servers 120, and PIC authentication servers 130. In one embodiment, the system 100 includes multiple POD servers 110 and PIC servers 120 and one PIC authentication server 130.

The servers described herein, including those of FIG. 1A, can be implemented using appropriate hardware and/or software. A server may include, for instance, a computer including a processor for executing instructions and a hardware-based memory device, such as a hard disk or other computer readable medium, for storing processor-executable instructions and one or more information databases. Alternatively, the server may include a program that provides services to programs in one or more computers; a host or a node having one or more components; or one or more entities (e.g., computers and/or programs) that have a common purpose and perform functions for that purpose. A given server can have components located in a single or multiple locations. For instance, a server "at" a medical clinic may have database(s) located offsite. Moreover, the server itself can be offsite, but accessible to users at the clinic via, for example, an Internet or other network connection.

In one implementation, each server in the distributed data network has a globally unique identifier created when the server is commissioned in the network or at another time. Commissioning processes are further described below. In an exemplary embodiment, the PIC authentication server generates and assigns identifiers. Identifiers can be generated, for instance, using random numbers, IP addresses, server names, and/or other suitable data or techniques.

Each POD server 110 stores, for each of multiple individuals, one or more pieces of data (PODs) that relate to an individual and a PIC corresponding to that individual. Pieces of data include any type of data elements or records stored in digital form. Examples of pieces of data include SNOMED CT (SNOMED Clinical Terms) codes, ICD (International Classification of Diseases) codes, MEDCIN codes, text, or other representations of clinical data.

In an exemplary implementation, a POD server 110 runs software to enable the POD server 110 to function within the distributed network, as well as end-user software. An end-user may include, for example, an individual who uses the distributed data network to generate data on behalf of the owner, such as the owner's doctor, or to retrieve de-identified data, such as a pharmaceutical researcher. The software may run, for instance, as stand-alone programs, RAM-resident services, and/or may be incorporated into the end-user software. An exemplary end-user software application is an electronic medical records ("EMR") program that is programmed to communicate with the network software. With the above software, a POD server 110 provides an interface by which individuals can create and register their PIC, and by which individuals can request data from other POD servers. In other embodiments, PIC creation, PIC registration, and/or requests for data can be initiated at other computers or computerized devices.

In one embodiment, the end-user software on a POD server distinguishes between information that could be used to identify an individual (e.g., name, street address, phone number, social security number, or primary contact information) and information that cannot be so used (de-identified data). De-identified data includes data that are complete and valid, but not associated with an ascertainable owner. For instance, de-identified data can include demographic information about the owner, but exclude information that could be used to identify the owner. The respective kinds of data can be stored in separate databases or in separate portions of the same database. Alternatively or additionally, data may be stored with flags indicative of the kind of data stored. Accordingly, remote search and retrieval of de-identified data stored on the POD server can be accomplished by sending only the de-identified data.

In one embodiment, a POD server at a hospital maintains a queue of generated patient PICs, such as recently generated PICs. Accordingly, a patient need not be physically present if a healthcare professional needs to search for and retrieve additional data associated with that patient. An individual's PIC may be deleted from the queue after a predetermined time period in the queue (e.g., twenty-four hours) and/or in response to the occurrence of one or more conditions (e.g., a hospital management system sends a notification that a patient has been released). Access to the stored PICs can be appropriately restricted to authorized hospital personnel.

In an exemplary embodiment, an individual can give another party access to the individual's PIC so that the party can access information for the individual as a proxy. For instance, a person could give his or her spouse access. In a particular implementation, the individual and the party must each provide respective PICs to the PIC authentication server in order to set up the proxy; the party's PIC is then associated with the individual's PIC for proxy purposes. Proxies may be optionally mutual, wherein the individual and the party have access to each other's data.

In one embodiment, a POD server 110 is associated with an organization, such as a medical clinic, bank, or law enforcement agency that may be an end-user in the system 100. The POD server 110 may run one or more applications or modules (e.g., an EMR program) that collects the pieces of data. The pieces of data stored on the POD server 110 are linked to the respective owning PICs at the time the data is collected. In addition, the linking of the pieces of data with the owning PICs can be exclusive to the POD server 110 on which the pieces of data are stored, or optionally backed up to other devices or media. Data for a given PIC can be collected and stored independently on other POD servers by other organizations and/or by the same organization with which the POD server 110 is associated. The POD server 110 allows a user to retrieve data for specific PICs from other POD servers, if retrieval is approved by the PIC authentication server 130.

FIG. 1B shows example databases 150 of the POD server 110. The POD server 110 maintains a PIC database (having PIC and POD fields) 152, a PIC server ID database 154, and a PIC ID database 156. These databases can be used for PIC server self-healing processes described below. It is to be appreciated that FIG. 1B presents the databases in simplified form for illustrative purposes.

Each PIC server 120 stores PICs and IDs of POD servers on which data corresponding to the respective PICs are stored. Herein, an ID or identifier includes any information used to provide an identification, linkage, association, or mapping with respect to the entity identified. In one embodiment, a particular PIC is registered on only one PIC server in any given industry classification at any given time. In an exemplary embodiment, the PIC server 120 maintains a POD server database associating each PIC with POD servers on which data corresponding to the respective PIC are stored.

In an exemplary implementation, a PIC server 120 runs software to enable the PIC server 120 to function within the distributed network. The software may run, for instance, as stand-alone programs and/or RAM-resident services.

PIC servers in the distributed network can be operated by various hosting companies. An individual registers with the respective hosting company in order to utilize the PIC servers of the hosting company. The hosting company may charge a registration fee.

In one implementation, the distributed data network has mechanisms in place to provide for data redundancy. For instance, PIC and POD server associations can be stored on both primary and secondary PIC servers. Accordingly, the network can continue to fulfill requests even when one of the PIC servers (the primary or the secondary server) is offline. In one embodiment, primary and secondary PIC servers are designated by a user. In another embodiment, primary and secondary PIC servers are assigned without substantial user direction. It is to be appreciated that, at the same time, a given PIC server can serve as a primary PIC server for a particular PIC, and as a secondary PIC server for a different PIC.

FIG. 1C shows an example database 160 of the PIC server 120. The PIC server 120 includes a POD server database having PIC and POD server ID fields. It is to be appreciated that FIG. 1C presents the database in simplified form for illustrative purposes.

The PIC authentication server 130 registers and authenticates each user based on the user's associated PIC. The PIC authentication server 130 also links each authenticated user to respective PIC servers storing associations for the user's PIC. To that end, the PIC authentication server 130 stores PICs and IDs of PIC servers that contain information on those PICs. The linking can be direct (e.g., a user through a POD server communicates directly with a PIC server) or indirect (e.g., another device communicates with the POD server such that the user at the POD server can access stored data).

In an exemplary implementation, the PIC authentication server 130 runs software to enable the PIC authentication server 130 to function within the distributed network. The software may run as, for instance, stand-alone programs and/or RAM-resident services.

In some embodiments, the PIC authentication server 130 also controls the commissioning and decommissioning of PIC servers and POD servers. Alternatively or additionally, the PIC authentication server 130 can replicate and synchronize data with other PIC authentication servers (not shown) on a periodic basis to ensure redundancy.

FIG. 1D shows example databases 170 of the PIC authentication server 130. The PIC authentication server 130 includes a PIC database 172, a PIC server integrity database 174, and a PIC server transfer database 176. The PIC database 172 associates each PIC with the primary and secondary PIC servers on which that PIC is registered. The PIC server integrity database 174 associates each PIC server found in the PIC database with one of a plurality of integrity status codes 178. In the embodiment shown, the status codes include an "OK" code, which indicates no action required; a "Rebuild" code, which indicates a PIC server was down for maintenance, repair, or was replaced with a new server, and, therefore, a need to rebuild the database contained on that PIC server; or a "Gone" code, which indicates the PIC server has not responded to queries in a predetermined number of days and is assumed to be no longer in service. These data are used to assist PIC servers in rebuilding their databases when necessary. The PIC server transfer database 176 is used for controlling data transfers between PIC servers when an individual changes the entity (e.g., hosting company) with which the individual is registered. It is to be appreciated that FIG. 1D presents the databases in simplified form for illustrative purposes.

In some implementations, the PIC authentication server 130 authenticates PICs and provides a mechanism for registration of a new PIC if no match in the PIC database is found. Otherwise, the PIC authentication server 130 responds with an authentication acknowledgement. In one embodiment of the distributed network, PIC authentication servers can be hosted by an entity whose server meets specified requirements.

The architecture of the distributed network ensures that, even if a server is compromised, the data on that server is in itself insufficient to seriously threaten security in the distributed network. In general, information is separately stored across the distributed network to achieve a high level of security. Additionally, the respective types of servers store different sets of data.

More particularly, a PIC authentication server maintains the master list of PICs and ensures the integrity of PICs throughout the distributed network. Security is provided because the PIC authentication server has no awareness of what data a POD server has for a given PIC. A PIC authentication request from a POD server for that PIC is not necessarily indicative that that POD server has stored data for the PIC, and instead may be a PIC authentication request as part of a search and retrieval request. A PIC server stores a list of the POD servers that store data for a given PIC. Security is provided because a PIC server can only register a PIC that originates from the PIC authentication server. A POD server stores both a PIC and its associated pieces of data. Security is provided because no one POD server contains all the pieces of data for a PIC. Moreover, no POD server that contains a given PIC has awareness of any other POD servers that also contain pieces of data for that PIC.

In general, so that it can function as a component of the distributed network or system 100, a server is first commissioned. Via the commissioning process, a server is made known to the network, and appropriate software and security certificates are installed thereon. In addition, the owner of the server is registered for billing purposes, so that PIC registration funds can be collected and remitted as intended. In an implementation, the commissioning process involves a server registration and activation process and occurs through a dedicated Internet website. Servers can be optionally qualified prior to commissioning to ensure that they have sufficient resources to perform the required tasks.

A POD server may be commissioned in the following exemplary manner. (1) Collect the server owner's name, billing address, and other contact information. (2) Collect the server's domain name or IP address. (3) Specify an appropriate industry code from a list. (4) Download the required security certificate. (5) Download the POD server distributed network software (if not included with end-user software to be run on the POD server). (6) After the software is installed, verify to the distributed network that the POD server is functioning properly.

A PIC server may be commissioned in the following exemplary manner. (1) Collect the server owner's name, billing address, and other contact information. (2) Collect the server's domain name or IP address. (3) Pay registration and/or software fee online, if any. (3) Download the required security certificate. (4) Download the PIC server distributed network software. (5) After the software is installed, verify to the distributed network that the PIC server is functioning properly.

A PIC authentication server may be commissioned in the following exemplary manner. (1) Collect the server owner's name, billing address, and other contact information. (2) Collect the server's domain name or IP address. (3) Pay registration and/or software fee online, if any. (4) Download the required security certificate. (5) Download the PIC authentication server distributed network software. (6) After the software is installed, verify to the distributed network that the PIC authentication server is functioning properly.

Figure 2:
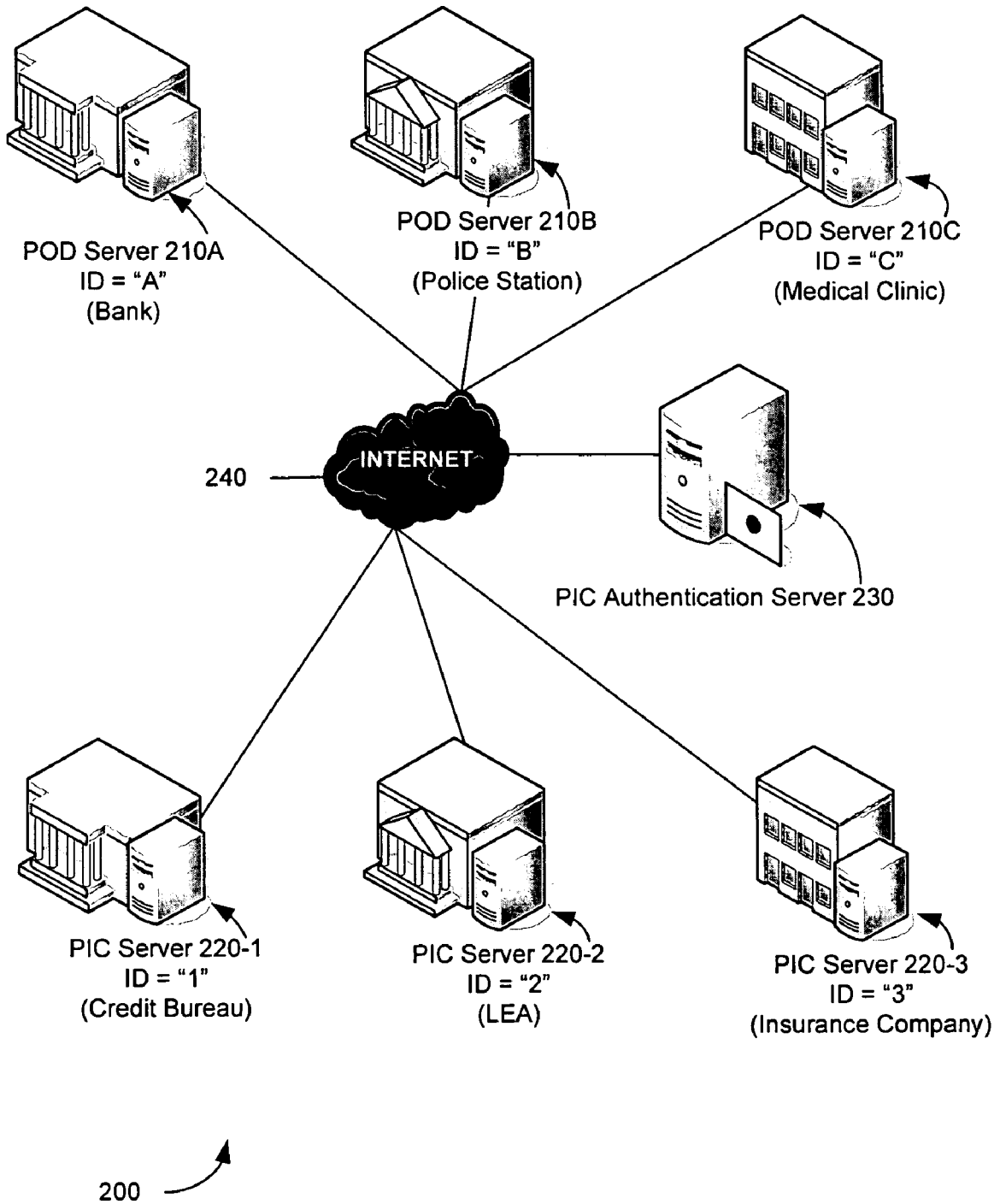
FIG. 2 shows a system according to an embodiment of the invention.

FIG. 2 shows an exemplary distributed network system 200 according to an embodiment of the invention. The system 200 includes a POD server 210A, a POD server 210B, a POD server 210C, a PIC server 220-1, a PIC server 220-2, a PIC server 220-3, and a PIC authentication server 230. The various servers intercommunicate via the Internet 240 and are operated by host organizations. The POD server 210A is associated with a bank, the POD server 210B with a police station, and the POD server 210C with a medical clinic. The PIC server 220-1 is associated with a credit bureau, the PIC server 220-2 with a law enforcement agency ("LEA"), and the PIC server 220-3 with an insurance company. The number and nature of the servers shown in FIG. 2 is arbitrary. It is to be appreciated that the system 200 may comprise any number of servers in disparate locations and sectors. Data for an individual can be stored in a distributed manner across the system 200. PIC servers can serve as primary PIC servers for certain PICs and as secondary PIC servers for other PICs.

Figure 3:
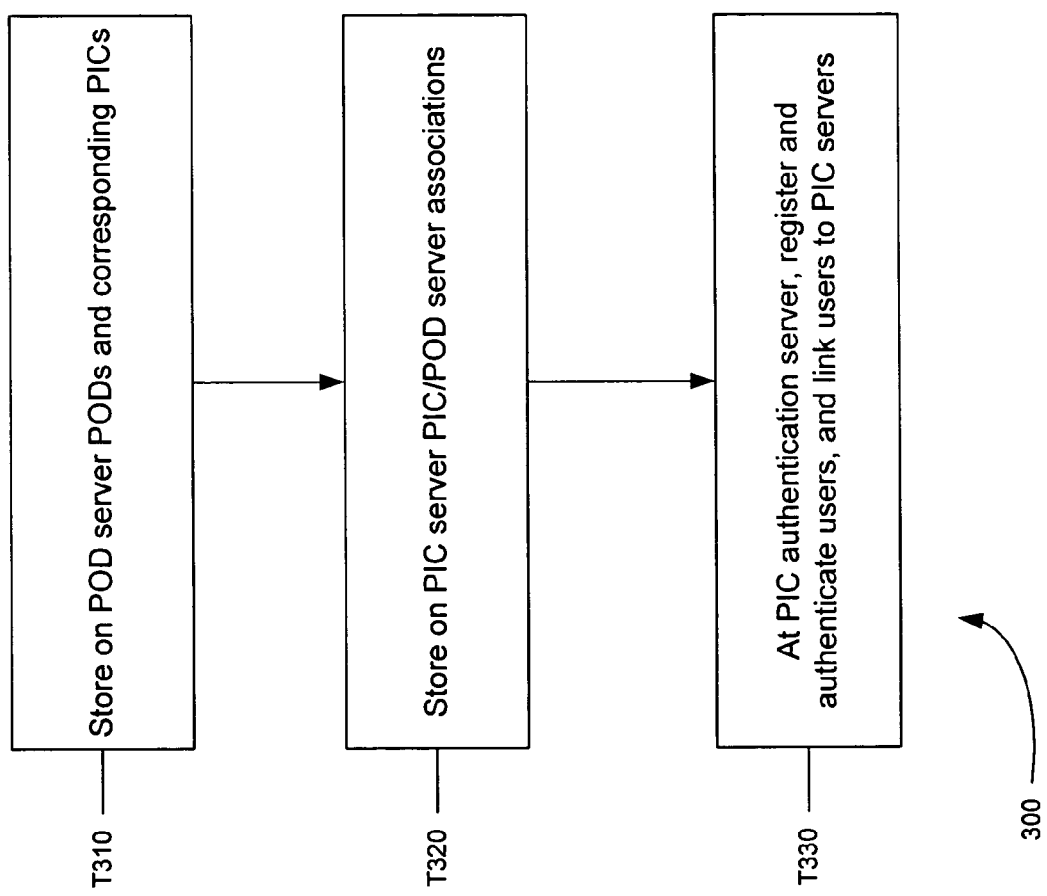
FIG. 3 shows a process according to an embodiment of the invention.

FIG. 3 shows an exemplary process 300 that can be applied, for example, in connection with data search and retrieval requests involving data stored in the systems 100 and 200 of FIGS. 1A and 2. Task T310 stores pieces of data and corresponding PICs on a POD server. Task T320 stores associations between PICs and POD servers on a PIC server. The associations identify POD servers on which pieces of data corresponding to the PICs are stored. Task T330, which occurs at a PIC authentication server, registers and authenticates users, and links users to appropriate PIC servers.

Figure 4:
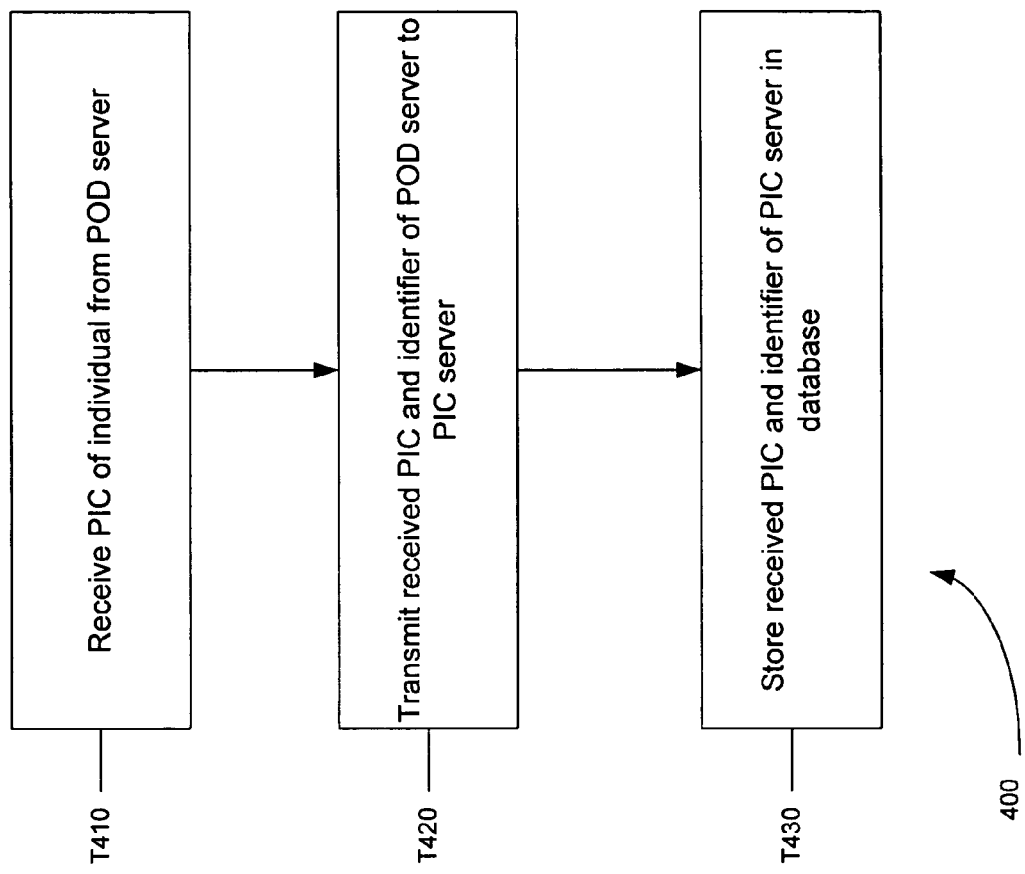
FIG. 4 shows a process according to an embodiment of the invention.

FIG. 4 shows an exemplary process 400 used to register an individual in a distributed network. The process 400 can be performed by a PIC authentication server, for example, in the systems 100 and 200 respectively shown in FIGS. 1A and 2. Task T410 receives the PIC of an individual from a POD server. Task T420 transmits the received PIC and an identifier of the POD server to a PIC server. Task T430 stores the received PIC and an identifier of the PIC server.

In one embodiment, PIC registration is required the first time an individual visits an organization that is to collect data for the individual and make that data available through a distributed network.

Figure 5:
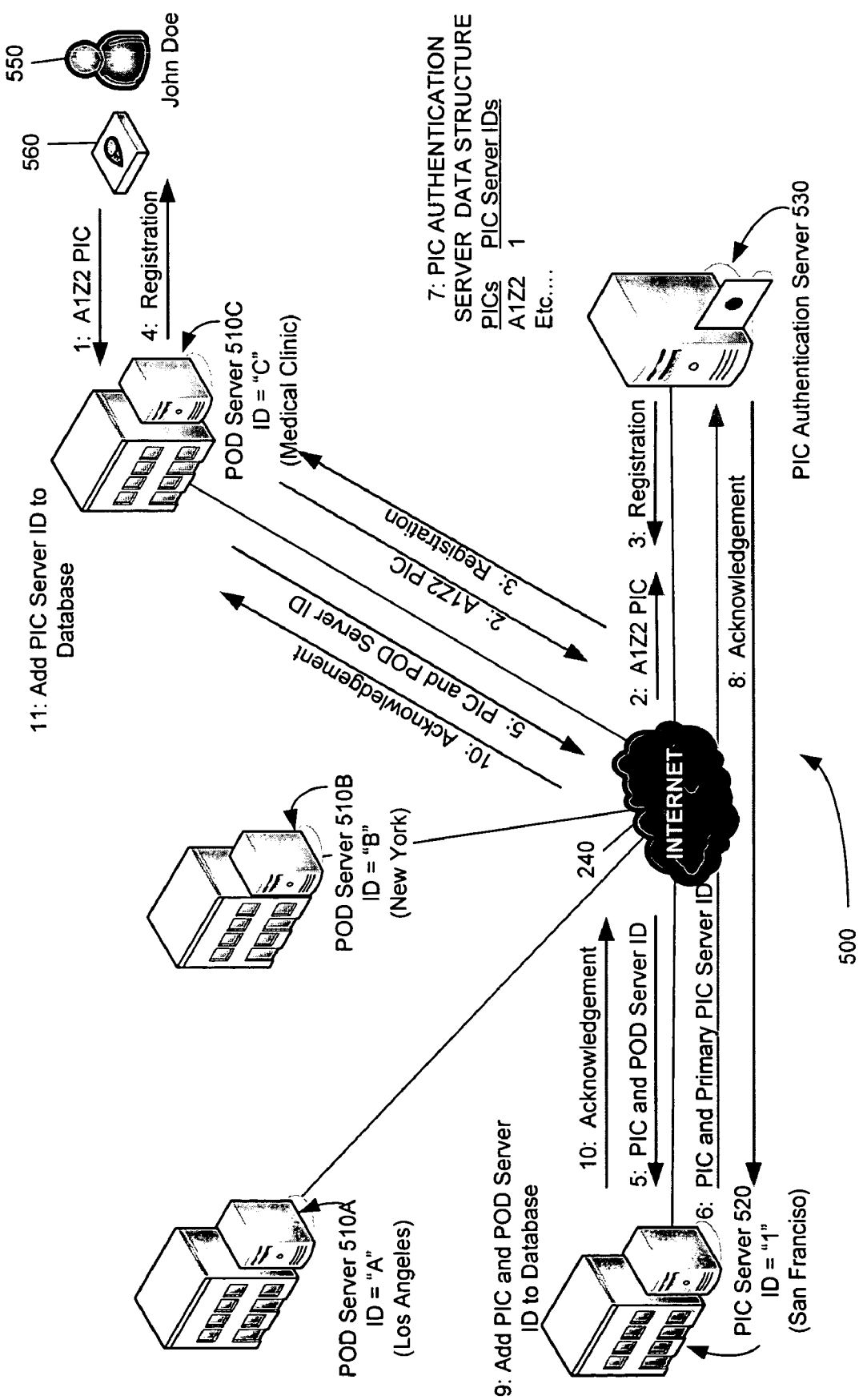
FIG. 5 shows a system and an example of a process flow according to an embodiment of the invention.

FIG. 5 shows a system 500 and an example of a process flow for user registration according to an embodiment of the invention. The system 500 includes a POD server 510A, a POD server 510B, a POD server 510C, a PIC server 520, and a PIC authentication server 530. The various servers intercommunicate via the Internet 240 and are operated by host organizations. In the example illustrated, the POD server 510A is located in Los Angeles, the POD server 510B is located in New York, the POD server 510C is associated with a medical clinic, and the PIC server 520 is located in San Francisco. An individual 550, who may be a patient, is present at or in electronic communication with the medical clinic.

An individual logs into the POD server 510C through a biometric logon, or some other identification system that is capable of reliably creating a globally unique identification code for the individual. The POD server 510C uses this information to generate a PIC 560 (Task 1) and sends the PIC 560 to the PIC authentication server 530 for authentication (Task 2). The PIC authentication server 530 recognizes that the PIC is not in its PIC database and initiates the registration process by transmitting a "PIC registration required" signal to the POD server 510C. (Task 3.) The POD server 510C requests that the individual 560 select a primary and secondary PIC server from a list of available PIC servers. (Task 4.) In this example, the PIC server 520 is the selected primary PIC server. The POD server 510C then transmits the PIC and POD server 510C ID information to the primary PIC server 520. (Task 5.) The primary PIC server 520 sends the PIC and PIC server 520 ID information to the PIC authentication server 530. (Task 6.) The PIC authentication server 530 adds the PIC, PIC server ID, and the registration date to its database. (Task 7.) The PIC authentication server 530 hosting organization optionally bills the PIC server host organization a registration fee. The PIC authentication server 530 transmits either a "successful registration" or an "error" signal back to the primary PIC server 520. (Task 8.)

If an "error" signal is sent, the primary PIC server 520 transmits an "error" signal back to the POD server 510C. If a "successful registration" signal is sent, the primary PIC server 520 adds the PIC, POD server 510C ID, and registration date information to its database. (Task 9.) The PIC server host organization has the option to bill the POD server host organization a registration fee. The primary PIC server 520 transmits a "successful registration" signal back to the POD server 510C. (Task 10.) The POD server 510C adds the primary PIC server ID to its PIC server ID database (Task 11), which can be used for more efficient server regeneration (described below). The POD server 510C then repeats Tasks 5 through 11 for the secondary PIC server (not shown). The POD server host organization optionally collects a registration fee from the individual.

In other embodiments, PIC servers register with an authentication server as a primary authentication server.

If registration of the secondary PIC server with the PIC authentication server 530 fails, a user may be asked to select another secondary PIC server. It is to be appreciated that the list of available PIC servers can be generated in various ways, and that primary and secondary servers may be located in different geographical areas. For instance, the PIC authentication server 530 may maintain or have access to location information for PIC servers. As such, the list of available PIC servers presented to a user can correspond to those servers within a predetermined distance from the user, for example.

In various embodiments, authentication processes are performed in systems herein in order to verify that an individual or server has the right to gain access to the distributed network. PIC authentication may be required anytime data is to be collected or retrieved through the distributed network.

Figure 6:
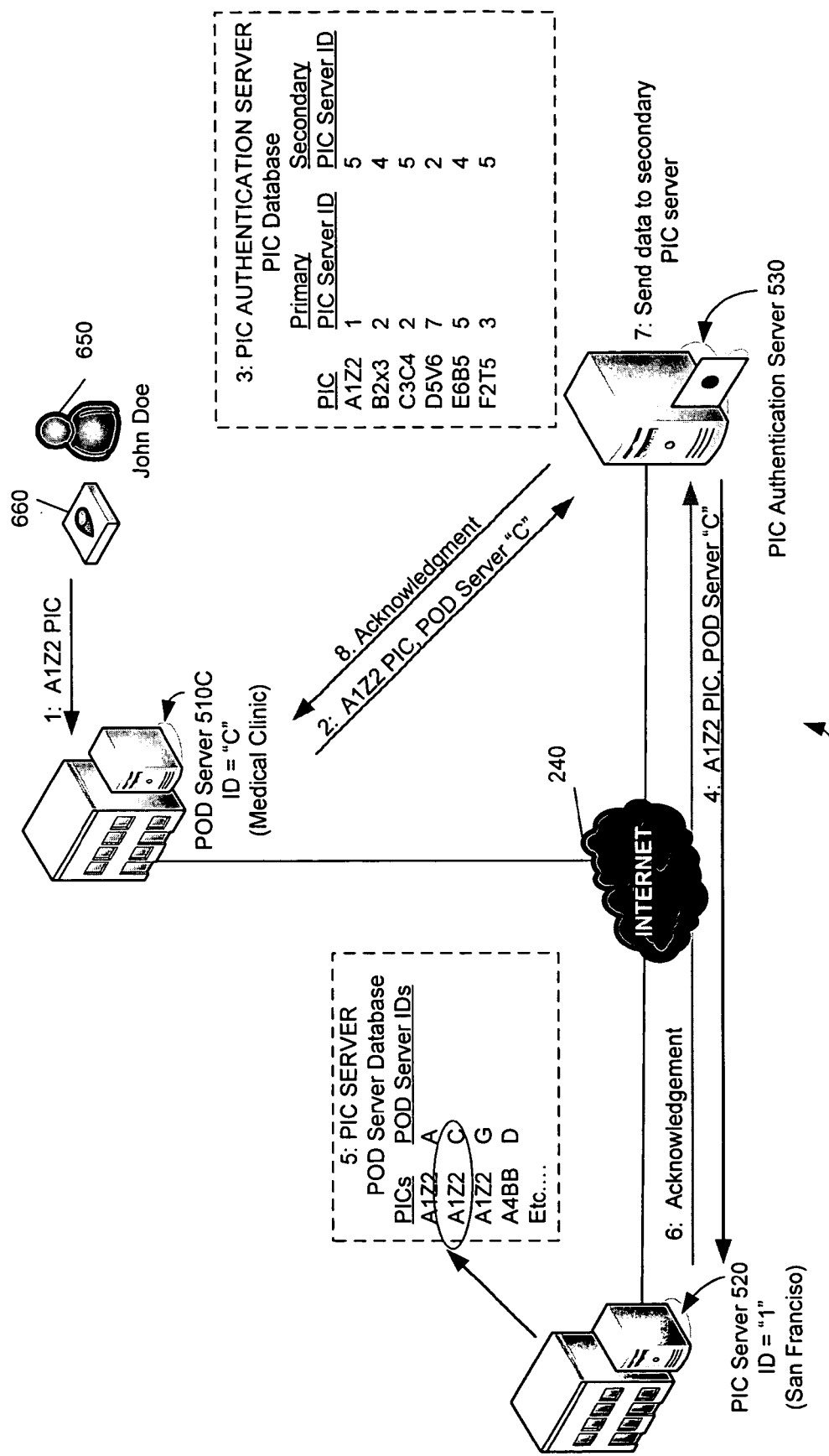
FIG. 6 shows a system and an example of a process flow according to an embodiment of the invention.

FIG. 6 shows a system 600 and an example of a process flow for PIC authentication according to an embodiment of the invention. The system 600 includes the POD server 510C, PIC server 520, and PIC authentication server 530 of FIG. 5 intercommunicating via the Internet 240 and operated by host organizations. An individual 650, who may be a patient, is present at or in electronic communication with the medical clinic associated with the POD server 510C. The PIC server 520 is a primary PIC server for the individual 650.

In the exemplary process flow of FIG. 6, the individual 650 logs into the POD server 510C through a biometric logon, or some other identification system that is capable of reliably creating a globally unique identification code for the individual. The POD server 510C uses this information to create a PIC 660 (Task 1) and sends the PIC 660 and the ID of the POD server 510C to the PIC authentication server 530 to request authentication (Task 2). The PIC authentication server 530 looks up and finds that the PIC 660 is in its PIC database (Task 3) and sends an authentication query to the primary PIC server 520, including the PIC and the POD server ID (Task 4). If the primary PIC server 520 is offline, the PIC 660 and POD server ID may be sent to the secondary PIC server. The PIC server 520 looks up and finds that the PIC 660 is in its database, and then checks to see whether the POD server ID is also in the database. If not, the PIC server 520 creates a record for this POD server ID. (Task 5.) The PIC server 520 sends an authentication "acknowledgement" signal back to the PIC authentication server 530, or an "updated" signal if an update is performed. (Task 6.) If an "updated" signal is received, Tasks 3 through 6 are repeated with the secondary PIC server (not shown) for redundancy (or the primary PIC server 520, if the secondary PIC server was contacted in Task 4). (Task 7.) If either PIC server is offline during this process, the PIC authentication server 530 keeps sending the update signal for a predetermined amount of time, and then flags the unresponsive PIC server with a Rebuild status in the PIC server integrity database. The PIC authentication server 530 sends an authentication acknowledgement back to the POD server 510C. (Task 8.)

In an alternative implementation of Tasks 4 through 7, the PIC authentication server 530 sends the PIC 660, the POD server 510C ID, and the secondary PIC server ID to the primary PIC server 520. If an update is needed, the primary PIC server 520 is responsible for ensuring that the secondary PIC server receives the update. If the secondary PIC server is offline, the primary PIC server 520 keeps attempting contact for a predetermined amount of time, and then sends a Rebuild status message to the PIC authentication server 530 with regard to the secondary PIC server.

Figure 7:
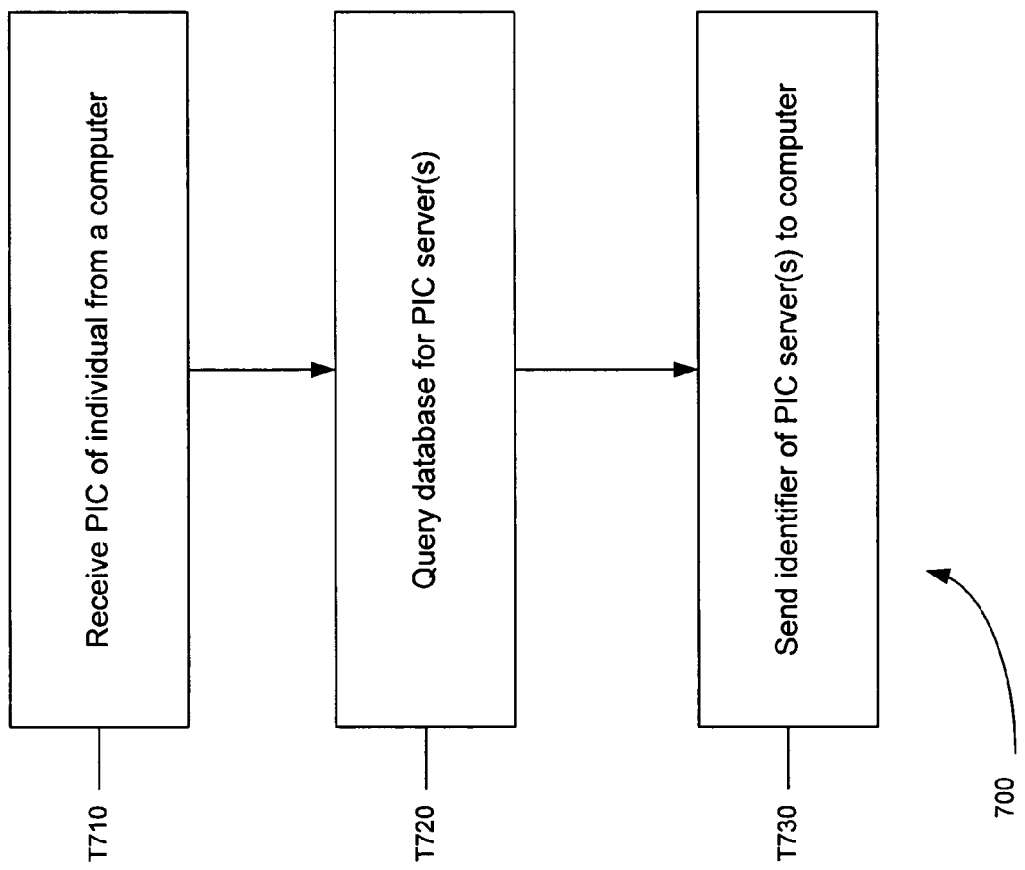
FIG. 7 shows a process according to an embodiment of the invention.

FIG. 7 shows an exemplary process 700 used to retrieve data associated with an individual in a distributed network. The process 700 may be performed by a PIC authentication server such as that described above. Task T710 receives the PIC of an individual from a computer, such as a POD server. Task T720 queries a database for PIC servers that store associations for that PIC. Task T730 sends an identifier of those PIC server(s) to the computer.

Figure 8:
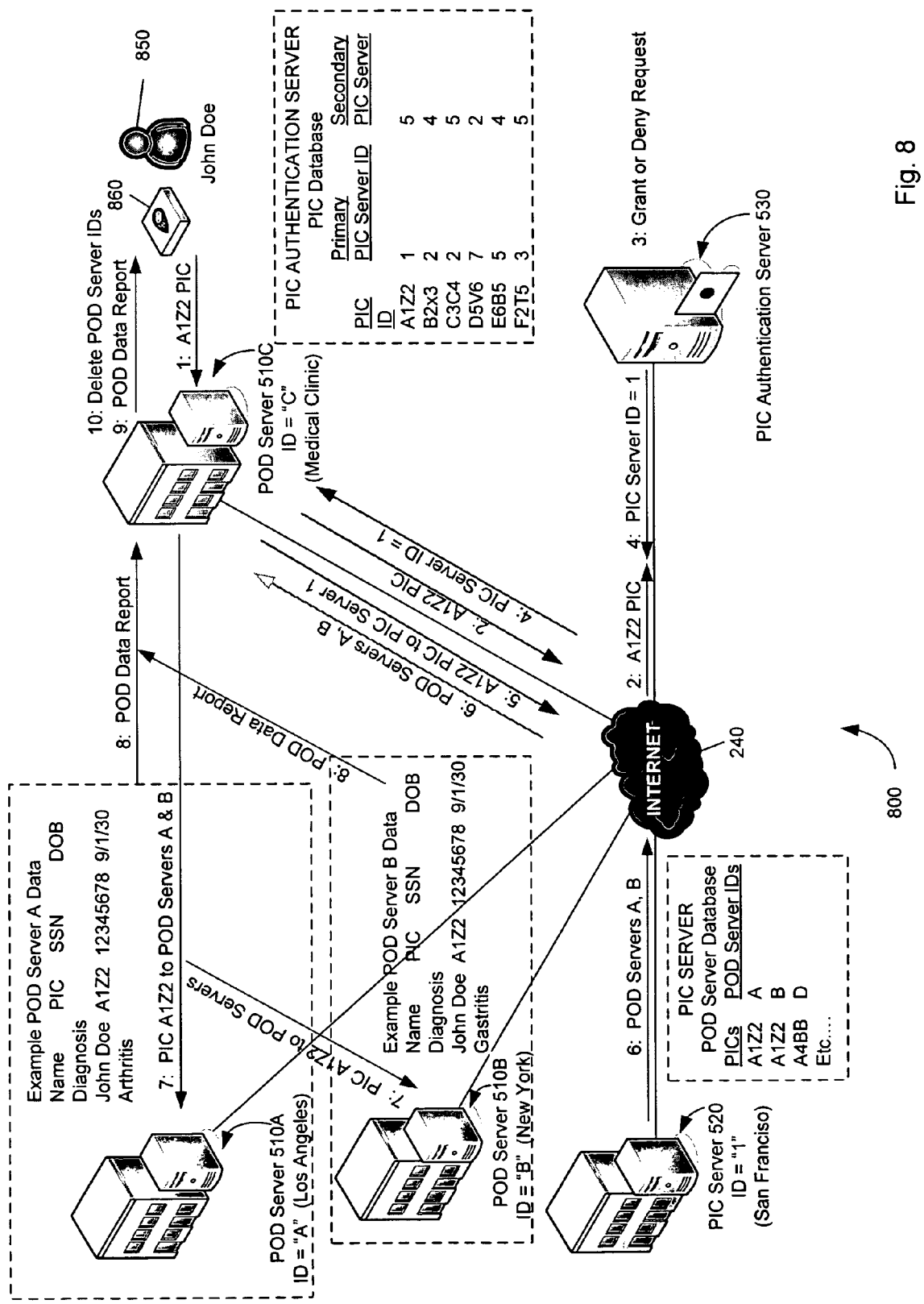
FIG. 8 shows a system and an example of a process flow according to an embodiment of the invention.

FIG. 8 shows a system 800 and an example of a process flow for distributed data retrieval according to an embodiment of the invention. The system 800 includes the POD server 510A, POD server 510B, POD server 510C, PIC server 520, and PIC authentication server 530 described in FIG. 5 above. An individual 850, who may be a patient, is present at or in electronic communication with the medical clinic. The PIC server 520 is a primary PIC server.

In the exemplary process flow of FIG. 8, the individual 850 logs into the POD server 510C through a biometric logon, or some other identification system that is capable of reliably creating a globally unique identification code for the individual. The POD server 510C uses this information to create a PIC 860 (Task 1) and sends the PIC 860 and the ID of the POD server 510C to the PIC authentication server 530 to request associated data for the PIC 860. (Task 2). The PIC authentication server 530 grants or denies the request upon applying authentication processes such as those described above. (Task 3.) If the request is granted (i.e., authentication is successful), the PIC authentication server 530 acknowledges the request for data retrieval by sending the primary PIC server 520 and secondary PIC server IDs back to the POD server 510C requesting data. (Task 4.) The POD server 510C can then communicate directly with the primary and secondary PIC servers to obtain the POD server IDs of all the other servers containing data associated with the PIC 860. The end-user software running on the POD server 510C can thus access the distributed network services to import data from other POD servers. These data may be cached on the local POD server 510C for a period of time (as authorized by the data owner), but are not necessarily stored permanently on the local POD server 510C. Accordingly, the remote data are generally deleted from the local POD server 510C after a brief period of time. At times, the owner may wish to authorize permanent storage, such as when the owner has changed primary care physicians and when the new physician works at a different clinic.

In particular, the POD server 510C sends a request for POD server IDs to the PIC server 520. (Task 5.) The PIC server 520 looks up the PIC 860 in its POD server database and sends to the POD server 510C the IDs of POD servers 510A and 510B, which are indicated in the POD server database of this example as being associated with the PIC 860. (Task 6.) The POD server 510C sends a request for data to the POD servers 510A and 510B. (Task 7.) The POD servers 510A and 510B send pieces of data corresponding to the PIC 860 to the POD server 510C. (Task 8.) The POD server 510C creates a data report combining data from both POD servers 510A, 510B. (Task 9.) After the retrieval session has completed and the retrieved data has been viewed and/or updated, the list of POD server IDs acquired from the PIC server 520 is deleted from the local POD server 510C. (Task 10.)

In other embodiments, de-identified data can be searched for and retrieved in the distributed network. For instance, search engines (e.g., search engines analogous to google-.com) can be established that index de-identified information stored in the distributed network. Using such a search engine, a user, such as a clinical researcher, can search for data of interest. Where relevant data is found, the data can be retrieved directly from the applicable POD server. Alternatively or additionally, data in the distributed network can be mined or stored in repositories for search and/or retrieval.

In one embodiment, if an individual needs to register with a different hosting company to utilize the services of that company's PIC server, all of this individual's PIC data are moved from the original PIC server to the new PIC server (and optionally a secondary PIC server). As soon as an individual indicates a desire to change the individual's registration, the PIC authentication server automatically performs the operations necessary to effect the change. New registration fees can apply.

Figure 9:
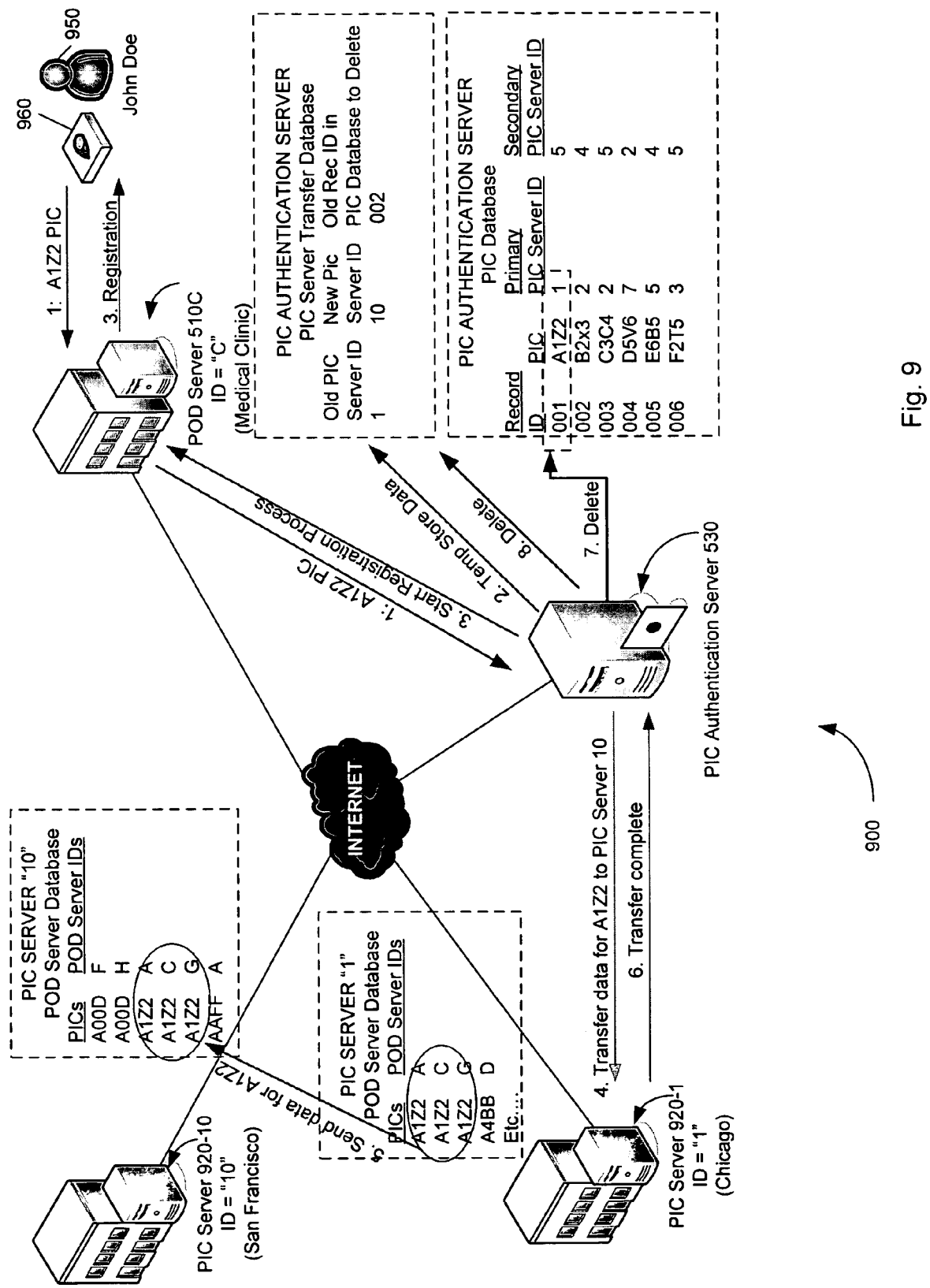
FIG. 9 shows a system and an example of a process flow according to an embodiment of the invention.

FIG. 9 shows a system 900 and an example of a process flow for a PIC registration change according to an embodiment of the invention. The system 900 includes a POD server 510C, a PIC server 920-1, a PIC server 920-10, and a PIC authentication server 530. The various servers intercommunicate via the Internet 240 and are operated by host organizations. In the example shown, the POD server 510C is associated with a medical clinic, the PIC server 920-1 is located in Chicago, and the PIC server 920-10 is located in San Francisco. An individual 950, who may be a patient, is present at or in electronic communication with the medical clinic. The PIC server 920-1 is a primary PIC server. Alternatively, the PIC 960 of the individual 950 is generated, stored, and made available for later use by another authorized party, such as the individual 950's doctor, when the individual 950 is not present, such as via a PIC queue or a proxy, as described above.

In the exemplary process flow of FIG. 9, the individual 950 logs into the POD server 510C through a biometric logon, or some other identification system that is capable of reliably creating a globally unique identification code for the individual. The POD server 510C uses this information to create a PIC 960 and sends the PIC 960 and a request for PIC server registration change to the PIC authentication server 530. (Task 1.) The original primary PIC server in this example is the PIC server 920-1. The PIC authentication server 530 authenticates the PIC 960 and temporarily stores in its PIC server transfer database the old PIC server ID for the PIC 960, as well as an identifier of the old records of the PIC database for the PIC 960. (Task 2.) The PIC authentication server 530 signals the POD server 510C to ask the individual 950 to select new primary and secondary PIC servers from a list of available PIC servers. (Task 3.) In this example, the selected new primary PIC server is the PIC server 920-10. Tasks 4 through 11 of the PIC registration process of FIG. 5 are performed with respect to the selected new primary and secondary PIC servers. The PIC authentication server 530 sends a transfer request to the original primary PIC server 920-1, along with the ID of the new primary PIC server 920-10. (Task 4.) The original primary PIC server 920-1 sends all records relating to the PIC 960 to the new primary PIC server 920-10. (Task 5.) Upon completion, the original primary PIC server 920-1 sends a "transfer complete" signal to the PIC authentication server 530. (Task 6.) The PIC authentication server 530 deletes old PIC records for the PIC 960 from the PIC database (Task 7) and the cached data from the PIC server transfer database (Task 8).

In an alternative process flow for a PIC registration change (not shown), the PIC authentication server stores a flag for the PIC that is the subject of a PIC registration change request. During automated server regeneration processes (see FIG. 10 and accompanying description below), when a POD server queries the PIC authentication server with respect to that PIC, the PIC authentication server notifies the POD server of the flagged condition. The POD server then reports to the new PIC server so that the new PIC server can record the identifier of the POD server.

In a distributed network, a PIC server may occasionally go offline, thereby preventing the retrieval of data. This may result, for example, from local communications problems, or from a failure in the PIC server itself. In a worst-case scenario, the PIC server catastrophically fails, requiring a full replacement of the server. It is to be appreciated that the provision of a secondary (and/or other backup) PIC server, which is selected or assigned during a registration process, ensures that requests can be handled by the secondary PIC server if the primary PIC server is offline. In an exemplary implementation, if there is ever any question about the integrity of the data contained on a PIC server, a regeneration process is initiated, either automatically by the PIC server, or manually by the hosting organization of the PIC server. The data on the PIC server can be completely reconstructed by the client POD servers.

Figure 10:
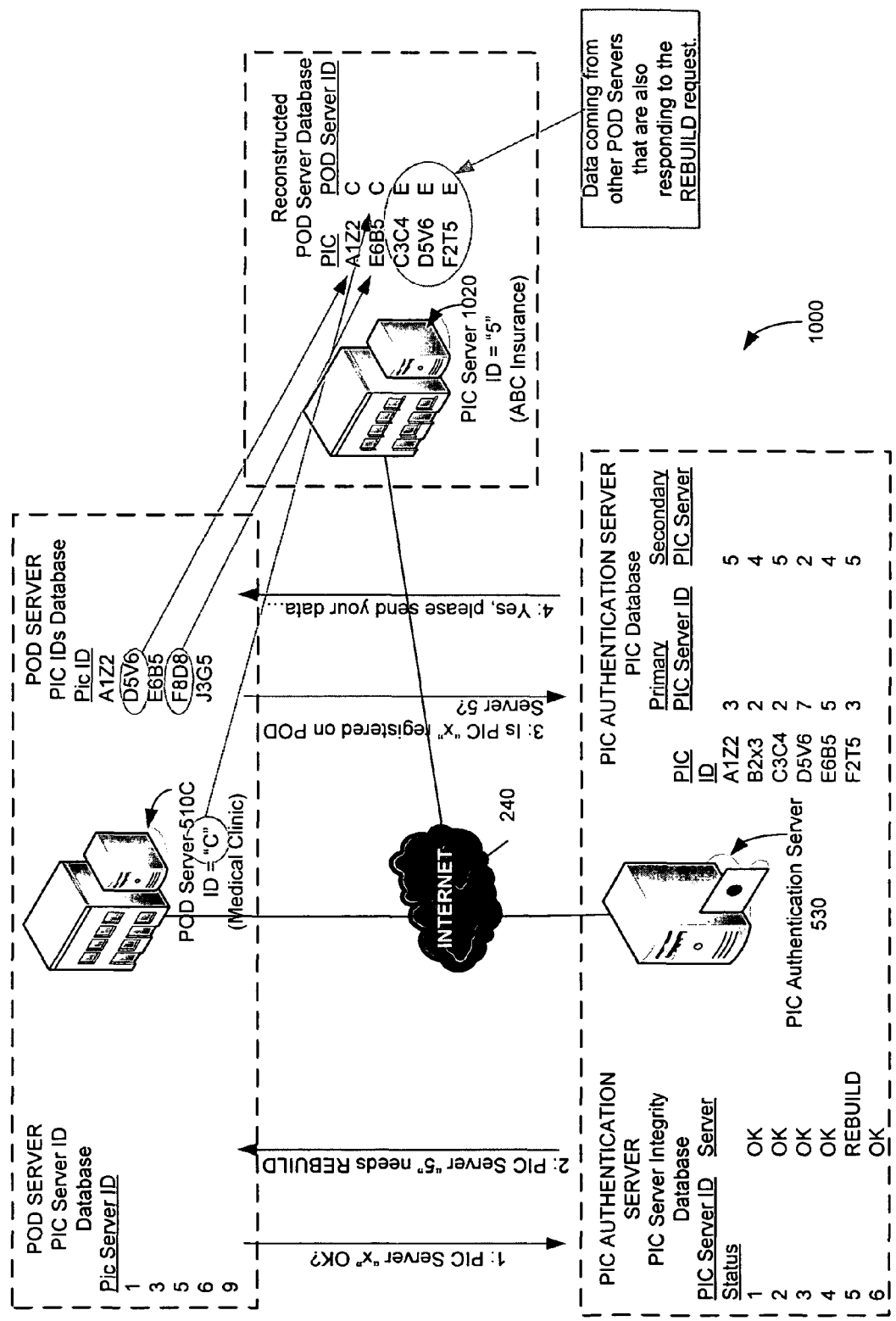
FIG. 10 shows a system and an example of a process flow according to an embodiment of the invention.

FIG. 10 shows a system 1000 and an example of a process flow for PIC server automated regeneration according to an embodiment of the invention. The system 1000 includes a POD server 510C, a PIC server 1020, and a PIC authentication server 530. The various servers intercommunicate via the Internet 240 and are operated by host organizations. The POD server 510C is associated with a medical clinic, and the PIC server 1020 is associated with an insurance company.

In the exemplary process flow of FIG. 10, the PIC authentication server 530 maintains a data integrity flag ("Server Status") in its PIC server integrity database, indicating the status of each PIC server registered by the PIC authentication server 530. Exemplary status signals are OK, Rebuild, or Gone. At irregular intervals or regular intervals (e.g., every 24 hours), the POD server 510C queries the PIC authentication server 530 to determine whether any of the PIC servers in its PIC server ID database have requested a "rebuild." (Task 1.) If the PIC authentication server 530 responds with an indication of a necessary "rebuild" for a PIC server (Task 2), the POD server 510C and PIC authentication server 530 assist the PIC server 1020 in rebuilding its POD server database. In particular, for each PIC in the POD server 510C's PIC ID database, the POD server 510C will query the PIC authentication server 530 to determine if that particular PIC is stored on the PIC server requiring the rebuild. (Task 3.) If the PIC authentication server 530 responds with a "yes" (Task 4), the POD server 510C transmits the PIC along with the POD server 510C ID to the PIC server 1020 being rebuilt so that it can add these data to its POD server database (Task 5).

In an alternative process flow for PIC server automated regeneration (not shown), POD servers do not send PICs to the PIC server being rebuilt. Instead, the PIC authentication server transmits such PICs to the PIC server, and the POD servers merely verify that they store particular PICs and associated pieces of data. The principle that POD servers do not send PICs to any server but the PIC authentication server also may be applied to embodiments not directly related to PIC server automated regeneration.

In the event that a hosting organization decides to, or needs to, retire its server from the distributed network, the server can be decommissioned in a way that does not disrupt services for the system users, allows functions of the server to be transferred to other servers, and allows billing functions to remain intact. Decommissioning generally involves uninstalling distributed network software from the server to be decommissioned, as well as performing updates to various databases in the distributed network. For example, when a PIC server is decommissioned, the information stored thereon is moved to one or more other PIC servers.

As should also be apparent to one of ordinary skill in the art, the systems shown in the figures are models of what actual systems might be like. Many of the modules and logical structures described herein are capable of being implemented in software executed by a microprocessor or a similar device or of being implemented in hardware using a variety of components including, for example, application specific integrated circuits ("ASICs"). Terms like "processor" may include or refer to both hardware and/or software. Furthermore, throughout the specification capitalized terms are used. Such terms are used to conform to common practices and to help correlate the description with the coding examples and drawings. However, no specific meaning is implied or should be inferred simply due to the use of capitalization. Thus, the claims should not be limited to the specific examples or terminology or to any specific hardware or software implementation or combination of software or hardware.

What is claimed:

1. A distributed network for storage and retrieval of data, the network comprising:

a plurality of data origin servers that store items of data, each data origin server including a data origin memory device in which items of data are stored;

a credential generator located in at least one of the plurality of the data origin servers and for generating a first set of credentials and a second set of credentials, each of the first set of credentials uniquely associated with an owner of corresponding items of data, and comprising a globally unique identifier of the owner of the corresponding items of data to enable search and retrieval of items of data, each of the second set of credentials associated with a user of the items of data and configured to be associated with one or more credentials of the first set of credentials;

a plurality of credential servers, each credential server including a credential memory device storing a plurality of representations of the first set of credentials and data-origin-server associations, each of the plurality of associations including a computer identifier and a computer address for each of a plurality of the data origin servers that store items of data, wherein the plurality of credential servers do not store any other identifiable data related to 1) owners of the items of data or 2) the owners' credentials, each credential server configured to link an authenticated user to a respective data origin server storing items of data corresponding to the user's credential; and an authentication server including one or more memories storing credentials and representations of credentials and computer-executable instructions that, when executed,
1) authenticate one or more of the users based at least in part on each of the users's associated credentials,
2) if authentication fails, provide an interface to register a user with one or more of the plurality of data origin servers, and
3) link an authenticated user to one or more credential servers associated with the user's credential, the authentication server configured to receive credentials from the plurality of data origin servers and transmit a representations of credentials to one or more of the plurality of credential servers.

2. The network of claim 1, wherein each credential further comprises an industry identifier.

3. The network of claim 1, wherein each credential is based, at least in part, on at least one biometric of the an individual associated with that credential.

4. The network of claim 1, wherein the items of data includes personal information.

5. The network of claim 1, wherein the authentication server maintains a database indicative of a status of at least one credential server.

6. The network of claim 1, wherein each data origin server maintains a database of credential server identifiers and a database of credentials.

7. The network of claim 1, wherein a user is registered with a hosting organization of a credential server.

8. The network of claim 1, wherein the items of data are de-identified with respect to the respective owners thereof.

9. A distributed network for storage and retrieval of data, the network comprising:
   a plurality of piece of data (POD) servers that store pieces of data, each POD server including a POD memory device in which the pieces of data are stored;
   a credential generator located in at least one of the plurality of POD servers and for generating a first set of credentials and a second set of credentials,
      each of the first set of credentials uniquely associated with an owner of corresponding pieces of data and comprising a globally unique identifier of the owner of the corresponding pieces of data to enable search and retrieval of pieces of data,
      each of the second set of credentials associated with a user of the pieces of data and configured to be associated with one or more credentials of the first set of credentials;
   a plurality of credential servers, each credential server including a credential memory device storing a plurality of representations of the first set of credentials and pieces-of-data-server associations, each of the plurality of associations including a computer identifier and a computer address for each of a plurality of the POD servers that store pieces of data, wherein the plurality of credential servers do not store any other identifiable data related to 1) owners of the items of data or 2) the owners' credentials, each credential server configured to link an authenticated user to a respective POD server storing pieces of data corresponding to the user's credential; and
   an authentication server including one or more memories storing credentials and representations of credentials and computer-executable instructions that, when executed,
   1) authenticate one or more a-users based at least in part on each of the users's associated credentials,
   2) if authentication fails, provide an interface to register a user with one or more of the plurality of data origin servers, and
   3) link an authenticated user to one or more credential servers associated with the user's credential, the authentication server configured to receive credentials from the plurality of data origin servers and transmit representations of credentials to one or more of the plurality of credential servers.

10. The network of claim 9, wherein a personal identification credential (PIC) server is configured to serve as a primary PIC server and a secondary PIC server with respect to a given PIC.

11. The network of claim 9, wherein the pieces of data are de-identified with respect to the respective owners thereof.

* * * * *